US008977453B2

(12) United States Patent
Komiya et al.

(10) Patent No.: US 8,977,453 B2
(45) Date of Patent: Mar. 10, 2015

(54) CONTROL APPARATUS FOR AUTOMATIC TRANSMISSION

(75) Inventors: Nobuaki Komiya, Wako (JP); Atsushi Kurauchi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 304 days.

(21) Appl. No.: 13/545,489

(22) Filed: Jul. 10, 2012

(65) Prior Publication Data

US 2013/0041563 A1 Feb. 14, 2013

(30) Foreign Application Priority Data

Aug. 10, 2011 (JP) ................................ 2011-175414

(51) Int. Cl.

| | |
|---|---|
| ***G06F 7/00*** | (2006.01) |
| ***F16H 61/662*** | (2006.01) |
| ***F16H 61/00*** | (2006.01) |
| *F16H 61/06* | (2006.01) |

(52) U.S. Cl.

CPC ........ *F16H 61/66272* (2013.01); *F16H 61/061* (2013.01); *F16H 61/0021* (2013.01); *B60Y 2400/308* (2013.01)

USPC .............................................. 701/60; 701/61

(58) Field of Classification Search

CPC .................................................... F16H 61/061

USPC ..................................................... 701/60–61

See application file for complete search history.

(56) References Cited

U.S. PATENT DOCUMENTS

| | | | | |
|---|---|---|---|---|
| 5,014,214 | A * | 5/1991 | Glowczewski et al. | 700/298 |
| 5,841,202 | A * | 11/1998 | Noguchi et al. | 307/10.1 |
| 6,717,386 | B1 * | 4/2004 | Kanasugi et al. | 322/27 |
| 2009/0088281 | A1 * | 4/2009 | Mizobe et al. | 475/123 |

FOREIGN PATENT DOCUMENTS

| | | | |
|---|---|---|---|
| JP | 4-50550 | A | 2/1992 |
| JP | 2002-21994 | A | 1/2002 |
| JP | 2007-205501 | A | 8/2007 |
| JP | 2008-2483 | A | 1/2008 |
| JP | 2008-121580 | A | 5/2008 |

OTHER PUBLICATIONS

Japanese Office Action dated May 22, 2013, issued in corresponding Japanese Patent Application No. 2011-175414, w/ English translation.

* cited by examiner

*Primary Examiner* — Calvin Cheung

(74) *Attorney, Agent, or Firm* — Westerman, Hattori, Daniels & Adrian, LLP

(57) ABSTRACT

In a control apparatus for an automatic transmission that changes speed of an engine output and transmits it to driven wheels, having an electromagnetic control valve installed in a hydraulic pressure supply device of the transmission and operated upon receipt of current to control hydraulic pressure supply to the transmission; and a current supply controller composed of a microcomputer installed on an electronic circuit board, calculating a current supply command value of the current supplied to the valve based on a hydraulic pressure supply control value of the transmission calculated based on the vehicle's operating condition and controlling current supply from a battery to the valve based on the command value, a load detector detects load of an electric device that shares ground set on the board with the valve; and the current supply controller calculates the command value based on the hydraulic pressure supply control value and detected load.

14 Claims, 5 Drawing Sheets

CONTROL APPARATUS FOR AUTOMATIC TRANSMISSION

BACKGROUND

1. Technical Field

This invention relates to a control apparatus for an automatic transmission.

2. Background Art

In an automatic transmission for changing an output of a prime mover to be mounted on a vehicle in speed and transmitting it to a driven wheel, since hydraulic pressure supply is controlled by energizing and deenergizing an electromagnetic control valve, e.g., a linear solenoid valve, installed in a hydraulic pressure supply device to carry out the shifting (gear change) operation. Accordingly, the characteristic variability of the electromagnetic control valve needs to be eliminated.

To cope with it, Japanese Laid-Open Patent Application 2007-205501 proposes a learning control technique to learn the characteristic variability of the electromagnetic control valve and based thereon, correct a current supply command so that hydraulic pressure to be supplied to the automatic transmission converges to a desired value.

SUMMARY

When the electromagnetic control valve (that is operated upon receipt of current from a power source installed in the vehicle so as to control hydraulic pressure supply to the automatic transmission) shares ground set on an electronic circuit board (printed circuit board) with another electric device in order to simplify the structure, and also when a controller (having a microcomputer to detect current to be supplied to the electromagnetic control valve to control hydraulic pressure supply to the automatic transmission) is equipped on the board, voltage may drop due to a resistance component of for instance, several milliohms to dozens of milliohms that exists between the ground set on the board and earth connected to, for example, an engine (or vehicle body) to which the minus terminal of the power source is connected, and the detection accuracy could be adversely affected. In particular, such noise is remarkably seen when the electromagnetic control valve and the other electric device are operated at high frequency with the PWM control, etc.

This noise that arises at the earth of electronic equipment can be easily eliminated if the electromagnetic control valve and the other electric device use different ground. However, it makes the structure complex.

An object of an embodiment of the invention is therefore to overcome the foregoing drawback by providing a control apparatus for an automatic transmission that, in the configuration that an electromagnetic control valve used to control hydraulic pressure supply to the automatic transmission shares ground set on an electronic circuit board with another electric device(s), makes the detection of current supplied to the electromagnetic control valve be less affected when a resistance component that exists between the ground and earth adversely affects.

In order to achieve the object, the embodiment of the invention provides in the first aspect an apparatus for controlling an automatic transmission that changes speed of an output of a prime mover mounted on a vehicle and transmits the output to a driven wheel, having an electromagnetic control valve that is installed in a hydraulic pressure supply device of the automatic transmission and is operated upon receipt of current from a power source to control hydraulic pressure supply to the automatic transmission, and a current supply controller that is composed of a microcomputer installed on an electronic circuit board and is adapted to calculate a current supply command value of the current supplied to the electromagnetic control valve based on a hydraulic pressure supply control value of the automatic transmission which is calculated based on an operating condition of the vehicle and control current supply from the power source to the electromagnetic control valve based on the calculated current supply command value, comprising: a load detector adapted to detect load of an electric device that shares ground set on the electronic circuit board with the electromagnetic control valve, wherein the current supply controller calculates the current supply command value based on the hydraulic pressure supply control value and the detected load.

In order to achieve the object, the embodiment of the invention provides in the second aspect a method for controlling an automatic transmission that changes speed of an output of a prime mover mounted on a vehicle and transmits the output to a driven wheel, having an electromagnetic control valve that is installed in a hydraulic pressure supply device of the automatic transmission and is operated upon receipt of current from a power source to control hydraulic pressure supply to the automatic transmission, and a current supply controller that is composed of a microcomputer installed on an electronic circuit board and is adapted to calculate a current supply command value of the current supplied to the electromagnetic control valve based on a hydraulic pressure supply control value of the automatic transmission which is calculated based on an operating condition of the vehicle and control current supply from the power source to the electromagnetic control valve based on the calculated current supply command value, comprising the step of: detecting load of an electric device that shares ground set on the electronic circuit board with the electromagnetic control valve; and operating the current supply controller to calculate the current supply command value based on the hydraulic pressure supply control value and the detected load.

BRIEF DESCRIPTION OF THE DRAWINGS

The above and other objects and advantages will be more apparent from the following description and drawings in which.

DESCRIPTION OF EMBODIMENT

A control apparatus for an automatic transmission according to an embodiment of the present invention will now be explained with reference to the attached drawings.

Figure 1:
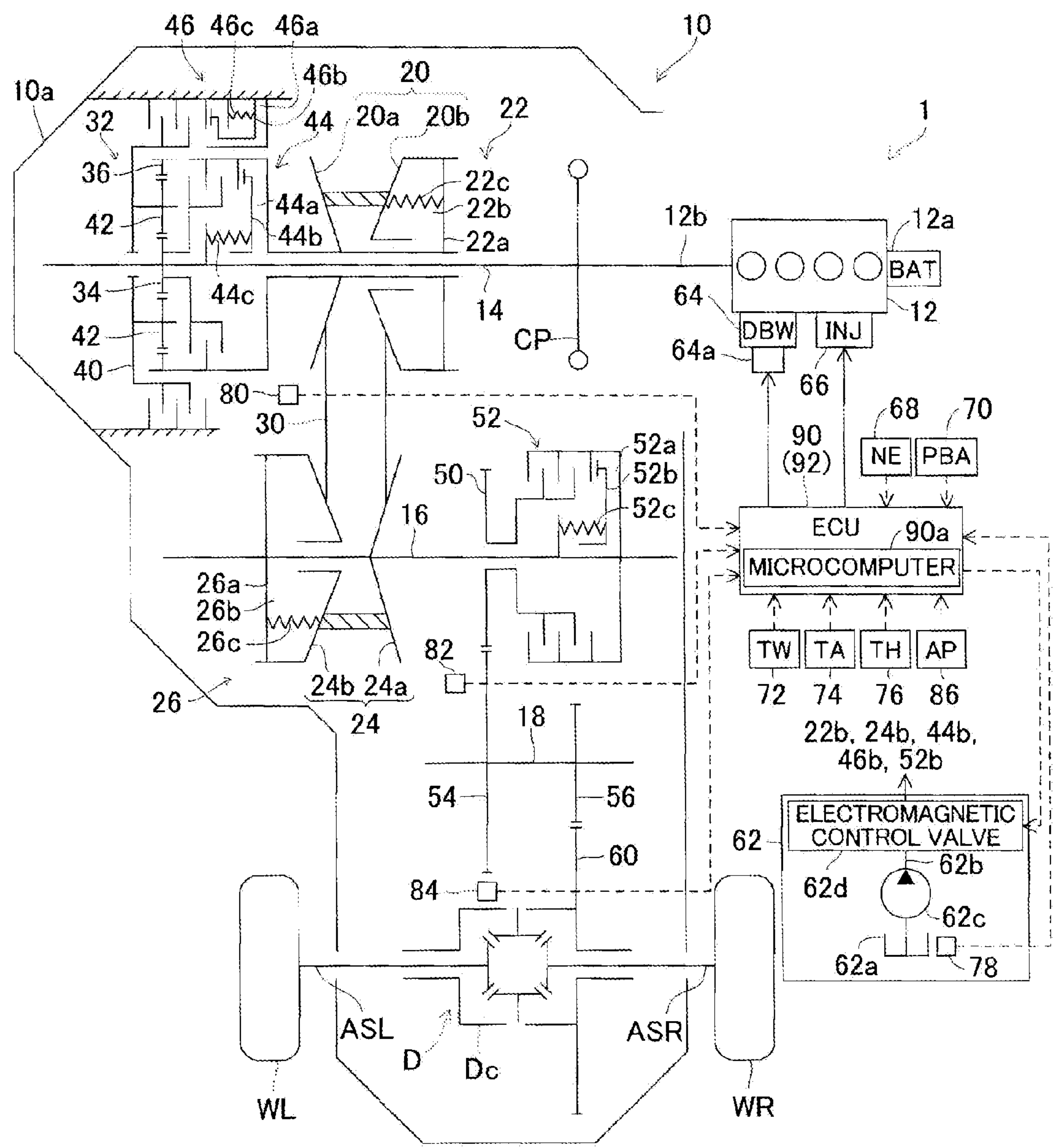
FIG. 1 is an overall view schematically showing a control apparatus for an automatic transmission according to an embodiment of this invention.

FIG. 1 is an overall view schematically showing a control apparatus for an automatic transmission according to an embodiment of this invention.

In FIG. 1, symbol 1 indicates a vehicle on which an automatic transmission, specifically a continuously variable transmission (hereinafter called the "CVT") 10 is mounted. The CVT 10 changes an output of an engine (prime mover) 12 in speed and transmits it to right and left driven wheels (front wheels) WR, WL through a differential mechanism D.

The engine 12 is a gasoline-injection, spark-ignition, four-cylinder engine and is equipped with a battery (indicated by "BAT" in FIG. 1) 12*a* whose rated capacity is 12 V. The battery 12*a* is charged by an alternator (not shown) connected to the engine 12. The minus terminal of the battery 12*a* is connected to a cylinder block (not shown) of the engine 12 to be grounded or earthed. Specifically, the minus terminal of the battery 12*a* is regarded as the earth reference point.

The CVT 10 has an input shaft 14, output shaft 16 and intermediate shaft 18 that are arranged in parallel, and is housed in a CVT case 10*a* together with the differential mechanism D. The input shaft 14 is connected to the engine 12, i.e., an output shaft (crank shaft) 12*b* thereof through a coupling mechanism CR The input shaft 14 is provided with a drive pulley 20 of the CVT 10.

The drive pulley 20 has a fixed pulley-half 20*a* that is installed at the input shall 14 to be not rotatable relative to the shaft 14 and immovable in the axial direction of the shaft 14, and a movable pulley-half 20*b* that is installed at the input shaft 14 to be not rotatable relative to the shaft 14 but movable in the axial direction of the shaft 14 relative to the fixed pulley-half 20*a*. A drive pulley width regulating mechanism 22 that regulates a pulley width (i.e., pulley clamping pressure) of the drive pulley 20 in response to supplied hydraulic pressure (pressure of operating oil) is installed beside the movable pulley-half 20*b*.

The drive pulley width regulating mechanism 22 has a cylinder wall 22*a* installed beside the movable pulley-half 20*b*, a cylinder chamber 22*b* formed between the cylinder wall 22*a* and the movable pulley-half 20*b*, and a return spring 22*c* installed in the cylinder chamber 22*b* to urge the movable pulley-half 20*b* toward the fixed pulley-half 20*a*.

When the hydraulic pressure in the cylinder chamber 22*b* is increased, the movable pulley-half 20*b* is moved closer to the fixed pulley-half 20*a* so that the pulley width of the drive pulley 20 becomes narrower (i.e., the pulley clamping pressure is increased). In contrast, when the pressure of the operating oil is decreased, the movable pulley-half 20*b* is moved away from the fixed pulley-half 20*a* so that the pulley width becomes wider (i.e., the pulley clamping pressure is decreased).

The output shaft 16 is provided with a driven pulley 24. The driven pulley 24 has a fixed pulley-half 24*a* that is installed at the output shaft 16 to be not rotatable relative to the shaft 16 and immovable in the axial direction of the shaft 16, and a movable pulley-half 24*b* that is installed at the output shaft 16 to be not rotatable relative to the shaft 16 but movable in the axial direction of the shaft 16 relative to the fixed pulley-half 24*a*. A driven pulley width regulating mechanism 26 that regulates a pulley width (i.e., pulley clamping pressure) of the driven pulley 24 in response to supplied hydraulic pressure is installed beside the movable pulley-half 24*b*.

The driven pulley width regulating mechanism 26 has a cylinder wall 26*a* installed beside the movable pulley-half 24*b*, a cylinder chamber 26*b* formed between the cylinder wall 26*a* and the movable pulley-half 24*b*, and a return spring 26*c* installed in the cylinder chamber 26*b* to urge the movable pulley-half 24*b* toward the fixed pulley-half 24*a*.

When the hydraulic pressure in the cylinder chamber 26*b* is increased, the movable pulley-half 24*b* is moved closer to the fixed pulley-half 24*a* so that the pulley width of the driven pulley 24 becomes narrower (i.e., the pulley clamping pressure is increased), while when it is decreased, the movable pulley-half 24*b* is moved away from the fixed pulley-half 24*a* so that the pulley width becomes wider (i.e., the pulley clamping pressure is decreased).

A metal V-shaped belt (power transmission element) 30 is wound around the drive pulley 20 and driven pulley 24. The belt 30 has a number of elements that are linked through a ring member (not shown). V-shaped surfaces formed at the elements of the belt 30 contact pulley surfaces of the drive pulley 20 and driven pulley 24, while being clamped or pressed from the both lateral sides, to transmit power of the engine 12 from the drive pulley 20 to the driven pulley 24.

Thus, in the CVT 10, the power transmission element comprising the belt 30 is installed between the input shaft 14 connected to the engine 12 and the output shaft 16 connected to the driven wheels WR, WL, i.e., between the drive pulley 20 and driven pulley 24.

A planetary gear mechanism 32 is provided on the input shaft 14. The planetary gear mechanism 32 has a sun gear 34 spline-fitted to the input shaft 14 to be rotated integrally therewith, a ring gear 36 formed integrally with the fixed pulley-half 20*a* of the drive pulley 20, a planetary carrier 40 installed to be rotatable relative to the input shaft 14, and a plurality of planetary gears 42 rotatably supported by the planetary carrier 40.

Each of the planetary gears 42 is always in mesh with both of the sun gear 34 and ring gear 36. An FWD (forward) clutch 44 is installed between the sun gear 34 and ring gear 36 and a RVS (reverse) brake clutch 46 is installed between the planetary carrier 40 and case 10*a*.

In the FWD clutch 44, upon the supply of the operating oil to a cylinder chamber 44*a*, a clutch piston 44*b* is displaced leftward (in FIG. 1) against spring force of a return spring 44*c*, so that a friction plate on the sun gear 34 side is engaged with a friction plate on the ring gear 36 side to couple the sun gear 34 to the ring gear 36, i.e., the FWD clutch 44 is engaged (brought to the in-gear position), thereby enabling the vehicle 1 to move forward.

In the RVS brake clutch 46, upon the supply of the operating oil to a cylinder chamber 46*a*, a brake piston 46*b* is displaced leftward (in FIG. 1) against spring force of a return spring 46*c*, no that a friction plate on the case 10*a* side is engaged with a friction plate on the planetary carrier 40 side to couple the case 10*a* to the planetary carrier 40, i.e., the RVS brake clutch 46 is engaged (brought to the in-gear position), thereby enabling the vehicle 1 to move backward (in reverse).

The output shaft 16 is provided with a starting clutch 52 together with an intermediate shaft drive gear 50. In the starting clutch 52, upon the supply of the operating oil to a cylinder chamber 52*a*, a clutch piston 52*b* is displaced against spring force of a return spring 52*c*, so that a friction plate on the output shaft 16 side is engaged with a friction plate on the intermediate shaft drive gear 50 side to couple the output shaft 16 to the drive gear 50.

The intermediate shaft 18 is provided with an intermediate shaft driven gear 54 and DF (differential) drive gear 56. Those gears 54, 56 are fixed at the intermediate shaft 18 and the intermediate shaft driven gear 54 is always in mesh with the intermediate shaft drive gear 50. The DF drive gear 56 is always in mesh with a DF driven gear 60 fixed at a case Dc.

The differential mechanism D is fastened with right and left axle shafts ASR, ASL and the ends of the shafts ASR, ASL are attached with the right and left driven wheels WR, WL, respectively. The DF driven gear 60 is always in mesh with the DF drive gear 56 so that the entire case Dc is rotated about the axle shafts ASR, ASL with the rotation of the intermediate shaft 18.

Under a condition where the pulley clamping pressure that can prevent the belt 30 from slipping is applied to the cylinder chamber 22*b* of the drive pulley 20 and the cylinder chamber 26*b* of the driven pulley 24 by controlling the pressure of the operating oil to be supplied to the cylinder chambers 22*b*, 26*b* of the pulleys, when the rotation of the engine 12 is inputted to the input shaft 14, the inputted rotation is transmitted from the input shaft 14, through the drive pulley 20, belt 30 and driven pulley 24 then to the output shaft 16.

At this time, the pulley clamping pressure of the drive pulley 20 and driven pulley 24 is increased and decreased to change their pulley widths to vary the winding radiuses of the belt 30 with respect to the pulleys 20, 24, whereby a continuous or stepless gear ratio can be achieved as desired in accordance with a ratio of the winding radiuses (pulley ratio).

The pulley widths of the drive and driven pulleys 20, 24 and the engagement and disengagement of the FWD clutch 44, DVS brake clutch 46 and starting clutch 52 are controlled by regulating the pressure of the operating oil (hydraulic pressure) to be supplied to the cylinder chambers 22*b*, 26*b*, 44*b*, 46*b*, 52*b* through a hydraulic pressure supply device 62.

The hydraulic pressure supply device 62 includes a hydraulic pump 62*c* that is driven by the engine 12 to pump up the operating oil from a reservoir 62*a* and discharge it to a hydraulic passage 62*b* and a group of electromagnetic control valves 62*d* installed in the hydraulic passage 62*d* to change flow and pressure of the operating oil.

A group of the electromagnetic control valves 62*d* include (normally-opened type) linear solenoid valves that control hydraulic pressure supply to the cylinder chambers 22*b*, 26*b* of the drive pulley width regulating mechanism 22 and driven pulley width regulating mechanism 26, shift solenoid valves that control hydraulic pressure supply to the cylinder chambers 44*a*, 46*a* of the FWD clutch 44 and RVS brake clutch 46, and a linear solenoid valve that also controls hydraulic pressure supply to the cylinder chamber 52*a* of the starting clutch 52, upon energized/deenergized.

A throttle valve (not shown) of the engine 12 installed in an intake system of the engine 12 has no mechanical connection with an accelerator pedal (not shown) installed at a floor of the operator's seat of the vehicle 1, i.e., is connected to a DBW (Drive-By-Wire) mechanism 64. The throttle valve is opened and closed by an actuator (stepper motor; electric device) 64*a* of the DBW mechanism 64.

In the engine 12, intake air regulated by the throttle valve flows through an intake manifold (not shown) and mixes with fuel injected through an injector 66 near an air intake port (not shown) of each cylinder to form air-fuel mixture, which flows into a combustion chamber (not shown) when an air intake valve (not shown) is opened. The air-fuel mixture in the combustion chamber is ignited and burned to drive a piston to rotate the output shaft 12*b*, and then discharged outside the engine 12 as exhaust gas. The injector 66 comprises an electromagnetic solenoid valve (electric device).

A crank angle sensor 68 is installed near a cam shaft (not shown) of the engine 12 or thereabout and produces an output or signal indicative of an engine speed NE at every predetermined crank angle position of the piston. In the intake system, a manifold absolute pressure sensor 70 is installed downstream of the throttle valve and produces an output or signal proportional to manifold absolute pressure (engine load) PBA.

A coolant temperature sensor 72 installed near a coolant passage (not shown) of the engine 12 produces an output or signal indicative of a coolant temperature TW and an intake air temperature sensor 74 installed upstream of the throttle valve produces an output or signal indicative of an intake air temperature TA. A throttle opening sensor 76 is installed near the stepper motor 64*a* of the DBW mechanism 64 and produces an output or signal proportional to a throttle opening TH.

An oil temperature sensor 78 is installed in the inside or thereabout of the reservoir 62*a* of the hydraulic pressure supply device 62 to produce an output or signal indicative of a temperature (ATF) of the operating oil to be supplied to the CVT 10.

An NDR sensor 80 is installed at an appropriate position near the drive pulley 20 of the CVT 10 to produce a pulse signal corresponding to a rotational speed of the drive pulley 20, i.e., input rotational speed NDR of the CVT 10, while an NDN sensor 82 is installed at an appropriate position near the driven pulley 24 to produce a pulse signal corresponding to a rotational speed of the driven pulley 24, i.e., output rotational speed NDN of the CVT 10.

A vehicle speed sensor 84 is installed near the intermediate shaft driven gear 54 of the intermediate shaft 18 and produces a pulse signal indicative of a vehicle speed (running speed of the vehicle 1) V using a rotational speed of the intermediate shaft driven gear 54. An accelerator position sensor 86 is installed near the accelerator pedal and produces an output or signal indicative of accelerator position or opening AP corresponding to an amount of operator's manipulation of the accelerator pedal.

The outputs of the crank angle sensor 68, etc., are sent to an Electronic Control Unit (ECU) 90. The ECU 90 has a microcomputer 90*a* and the above sensor outputs are inputted to the microcomputer 90*a*. Based on the sensor outputs, the microcomputer 90*a* of the ECU 90 controls the operations of the engine 12, CVT 10, FWD clutch 44, RVS brake clutch 46 and starting clutch 52.

Specifically, the microcomputer 90*a* retrieves the characteristics (mapped data) set beforehand using the engine speed NE obtained based on the output of the crank angle sensor 68 and the manifold absolute pressure PBA detected by the manifold absolute pressure sensor 70, to calculate opening time of the injector 66, i.e., calculate the fuel injection amount, and supplies power (current) of the battery 12*a* to the injector 66 through a drive circuit, thereby driving the injector 66 through the PWM control.

Based on the same parameters, the microcomputer 90*a* also calculates the ignition timing and ignites the air-fuel mixture generated by fuel injection by means of an ignition device (not shown), while supplying power (current) of the battery 12*a* to the stepper motor 64*a* of the DBW mechanism 64 to drive it with the rotating direction input pulse.

Further, the microcomputer 90*a* supplies power (current) of the battery 12*a* to a group of the electromagnetic control valves 62*d* of the hydraulic pressure supply device 62 through a drive circuit (not shown) to drive them using the PWM control.

Specifically, the microcomputer 90*a* calculates desired clamping pressure values (hydraulic pressure supply control value) of the pulleys 20, 24 of the CVT 10 based on the sensor outputs, calculates a current supply command value based on the calculated desired values, and based on the calculated current supply command value, supplies power (current) of the battery 12*a* to a relevant linear solenoid valve from among the electromagnetic control valves 62*d* of the hydraulic pressure supply device 62 through an associated drive circuit to drive it using the PWM control.

Further, the microcomputer 90*a* similarly supplies power (current) of the battery 12*a* to a relevant linear solenoid valve from among the electromagnetic control valves 62*d* of the hydraulic pressure supply device 62 through an associated drive circuit to drive it using the PWM control, thereby controlling the engagement/disengagement of the clutches 44, 46, 52.

Figure 2:
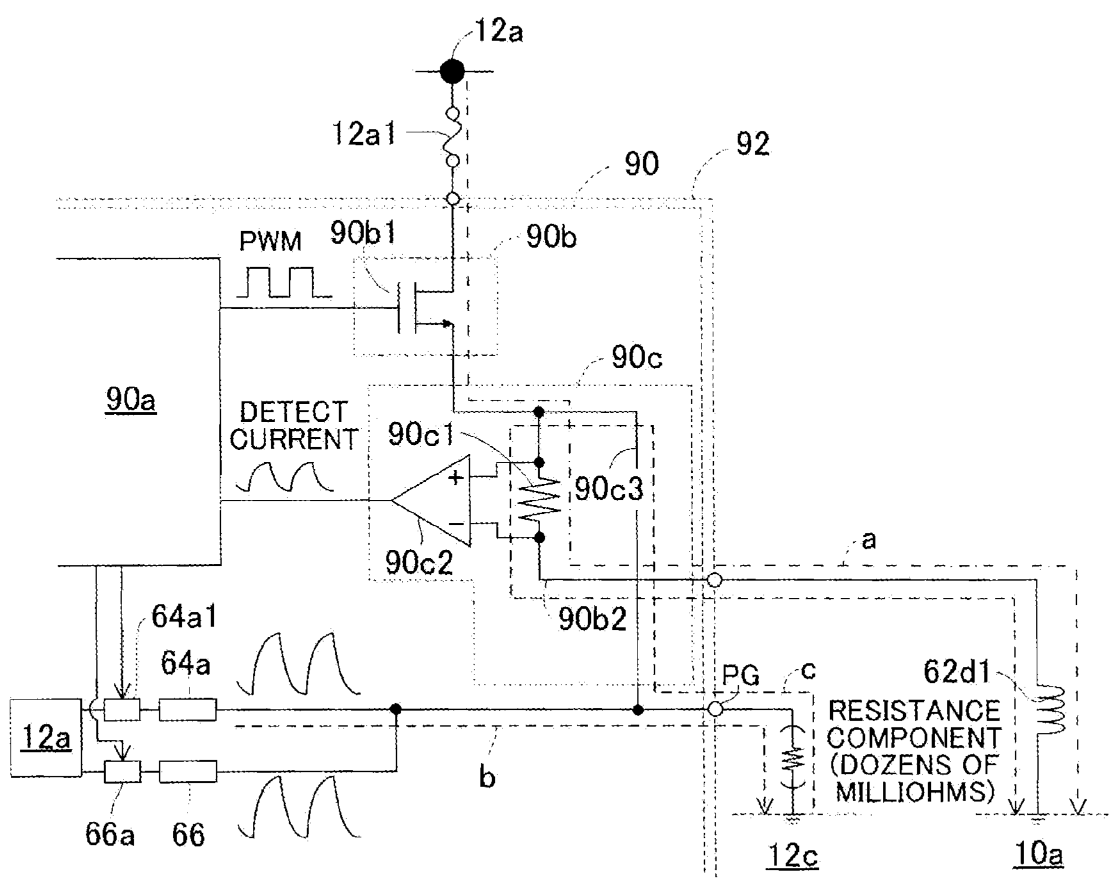
FIG. 2 is a circuit diagram showing from the hardware aspect the operation of current supply to an electromagnetic control valve, etc., conducted by an ECU shown in FIG. 1.
Figure 3:
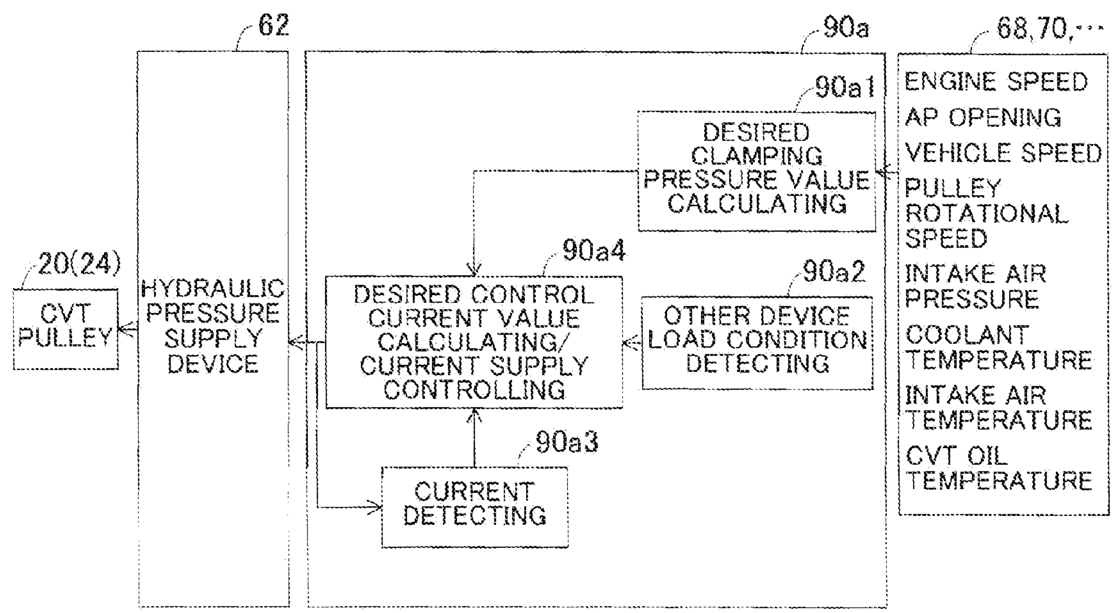
FIG. 3 is a block diagram showing the same operation as in FIG. 2 from the software aspect.

FIG. 2 is a circuit diagram showing from the hardware aspect the operation of current supply to the relevant linear solenoid valve (indicated by 62*d*1 in the figure) used for controlling the clamping pressure of the pulley 20 (or 24) of the CVT 10, which operation is one of the operations of the microcomputer 90*a* of the ECU 90, and FIG. 3 is a block diagram showing the same operation from the software aspect.

As illustrated, the ECU 90 is installed on an electronic circuit board (printed circuit board) 92 and ground (power ground) PG is set on the board 92.

In this embodiment, in order to simplify the structure, the linear solenoid valve 62*d*1 shares the ground (power ground) PG set on the board 92 with other electric devices such as the injector 66 and the stepper motor 64*a* of the DBW mechanism 64.

In the ECU 90, when the gate terminal of an FET 90*b*1 of a drive circuit (indicated by 90*b*) is supplied with a drive pulse of the PWM control, a section between the drain and source terminals are turned on (PWM ON) with an H-level input, and as indicated by an arrow a (dashed-dotted line), current from the battery 12*a* flows via a fuse 12*a*1 through a current supply path 90*b*2 and the linear solenoid valve 62*d*1 (more precisely, its solenoid), and then to the CVT case 10*a* (earth).

The ECU 90 is provided with a current detecting circuit 90*c*. The current detecting circuit 90*c* is composed of a current detecting resistor 90*c*1 interposed at the current supply path 90*b*2 and an operational amplifier 90*c*2 whose positive and negative terminals are connected across the current detecting resistor 90*c*1. The operational amplifier 90*c*2 produces an output or signal indicative of voltage drop of the current detecting resistor 90*c*1.

The output of the operational amplifier 90*c*2 is sent to the microcomputer 90*a* and based thereon, the microcomputer 90*a* detects a value of current to be supplied to the linear solenoid valve 62*d*1.

The microcomputer 90*a* feedback-controls current supply to the linear solenoid valve 62*d*1 using the PWM control so that the detected value of supply current to the linear solenoid valve 62*d*1 converges to a desired control current value (current supply command value) that is calculated from the desired clamping pressure values calculated based on the sensor outputs.

To be more specific, the microcomputer 90*a* feedback-controls current supply by controlling a duty factor of the PWM control so that the supply current value to the linear solenoid valve 62*d*1 converges to the desired control current value.

The injector 66 and stepper motor 64*a* are connected to the battery 12*a* and microcomputer 90*a* through drive circuits 66*a*, 64*a*1 in parallel with a connection path 90*c*3 connecting the upstream side of the current detecting resistor 90*c*1 to the ground PG.

In the case where the linear solenoid valve 62*d*1 and other electric devices share the ground PG set on the board 92 as shown in FIG. 2 in order to simplify the structure, voltage may drop due to a resistance component of, for instance, several milliohms to tens of milliohms that exists between the ground PG and earth of, for instance, a cylinder block (indicated by 12*c*) of the engine 12 to which the minus terminal of the battery 12*a* is connected, and it could adversely affect the detection accuracy at the current detecting circuit 90*c* (more precisely, the current detecting resistor 90*c*1). In particular, it is remarkably seen when the linear solenoid valve 62*d*1 and other electric devices are operated at high frequency with the PWM control, etc.

Specifically, when a drive pulse of L-level is inputted to the gate terminal of the FET 90*b*1 of the drive circuit 90*b* so that the FET 90*b*1 is turned off (PWM OFF), due to current (indicated by an arrow b of dashed line) to be supplied to the injector 66 and stepper motor 64*a*, current flows from the cylinder block 12*c* of the engine 12, through the aforesaid resistance component and ground PG, and further through the current detecting resistor 90*c*1 and linear solenoid valve 62*d*1, to the CVT case 10*a*, as indicated by an arrow c of dashed line.

Since, as mentioned above, the output indicative of voltage drop of the current detecting resistor 90*c*1 is sent from the operational amplifier 90*c*2 of the current detecting circuit 90*c* to the microcomputer 90*a*, consequently, a current value to the linear solenoid valve 62*d*1 may be inaccurately detected due to the current indicated by the arrow c. Further, the aforementioned current feedback-control of the linear solenoid valve 62*d*1 may be diverged.

To cope with it, this embodiment is configured such that the microcomputer 90*a* includes a desired clamping pressure value calculating block 90*a*1 that calculates the desired clamping pressure values (hydraulic pressure supply control value) of the CVT 10 based on the operating condition of the vehicle 1 detected by the sensors, an other device load condition detecting block 90*a*2 that detects load of the injector 66 and stepper motor 64*a* which share the ground PG with the linear solenoid valve 62*d*1, a current detecting block 90*a*3 that detects a current value supplied to the linear solenoid valve 62*d*1, and a desired control current value calculating/current supply controlling block 90*a*4 that calculates the desired control current value (current supply command value) of current to the linear solenoid valve 62*d*1 based on the desired clamping pressure values and the detected load and feedback-controls current supply to the linear solenoid valve 62*d*1 using the PWM control so that the detected supply current value converges to the calculated desired control current value.

Figure 4:
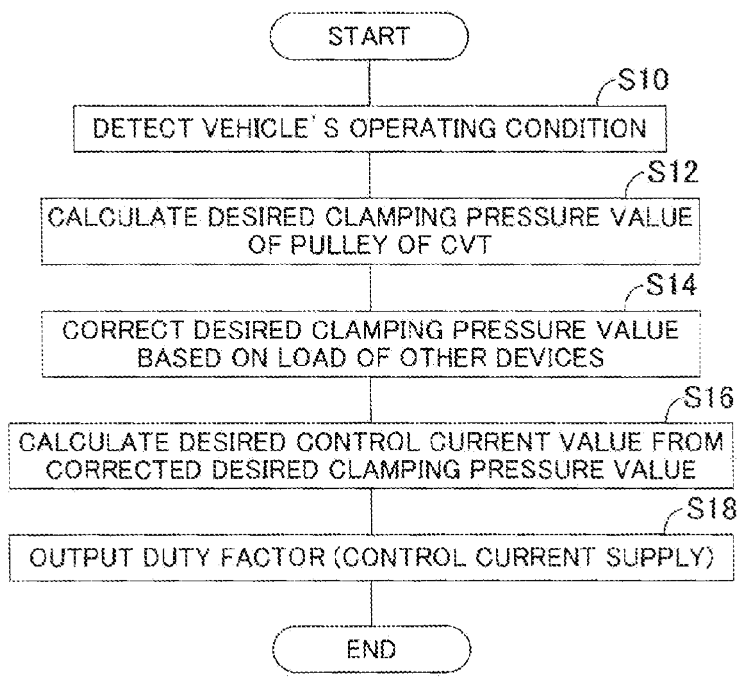
FIG. 4 is a flowchart more specifically showing the operation shown in FIG. 3.

FIG. 4 is a flowchart more specifically showing the operation shown in FIG. 3.

The program begins at S (Step; Processing step) 10 in which the operating condition of the vehicle 1 is detected based on the sensor outputs. The program proceeds to S12 in which the desired clamping pressure values (hydraulic pressure supply control value) of the pulleys 20, 24 of the CVT 10 are calculated, and to S14 in which the load of the other devices including the injector 66 and stepper motor 64*a* that share the ground PG with the linear solenoid valve 62*d*1 is detected and based on the detected load, the desired clamping pressure values are corrected.

The load of the other devices is detected by detecting supply current to the injector 66 and stepper motor 64*a*, similarly to the current detecting block 90*a*3 that detects the current value supplied to the linear solenoid valve 62*d*1.

Figure 5:
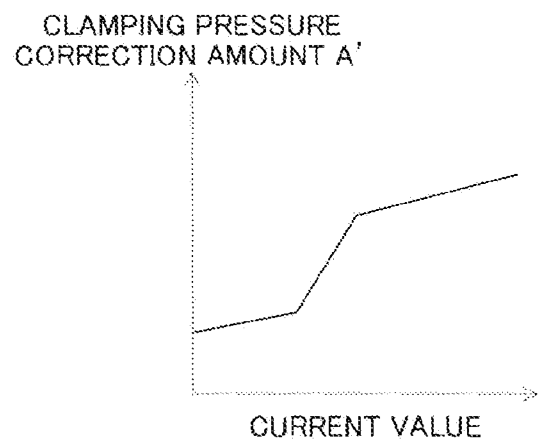
FIG. 5 is an explanatory view showing the characteristics of a clamping pressure correction amount used for correcting a desired clamping pressure value, with respect to load (supply current) detected at another electric device.
Figure 6:
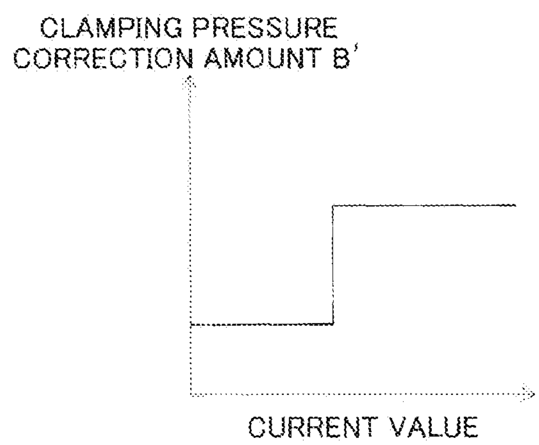
FIG. 6 is an explanatory view similarly showing the characteristics of the clamping pressure correction amount used for correcting the desired clamping pressure value, with respect to load (supply current) detected at still another electric device.

FIGS. 5 and 6 are explanatory views showing the characteristics of clamping pressure correction amounts used for correcting the desired clamping pressure value, with respect to the load (supply current) detected at the injector 66 (FIG, 5) and the stepper motor (FIG. 6).

In the processing of S14, a clamping pressure correction amount A' is retrieved using the detected load of the injector 66, while a clamping pressure correction amount B' is retrieved using the detected load of the stepper motor 64*a*. Next, the retrieved clamping pressure correction amounts A', B' are added to the desired clamping pressure value (calculated in S12) to incrementally correct the desired clamping pressure value.

As shown in FIGS. 5 and 6, the clamping pressure correction amounts A', B' are set to increase as the detected load is larger.

Returning to the explanation on FIG. 4, the program proceeds to S16 in which the desired control current value is calculated from the corrected desired clamping pressure value.

Figure 7:
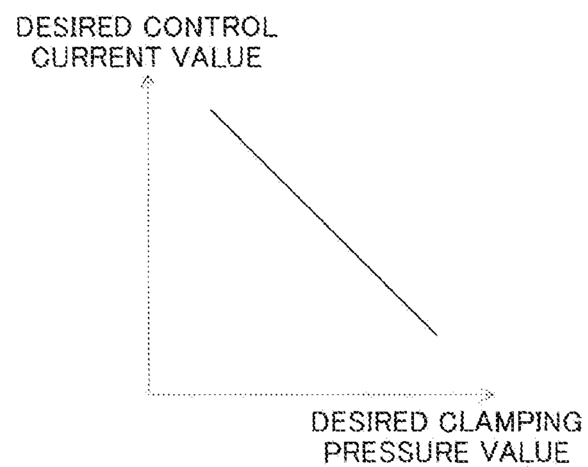
FIG. 7 is an explanatory view showing the characteristics used for calculating a desired control current value shown in FIG. 4.

FIG. 7 is an explanatory view showing the characteristics used for calculating (converting) the desired control current value with respect to the desired clamping pressure value. As illustrated, the characteristics to be retrieved using the corrected desired clamping pressure value are set beforehand and in the processing of S16, the desired control current value is calculated by retrieving the characteristics using the desired clamping pressure value.

Since the linear solenoid valve 62*d*1 is the normally-opened type, i.e., released (opened) when it is not supplied with current (not energized), the desired control current value is set to decrease as the corrected desired clamping pressure value is increased, as can he seen in FIG. 7.

In the FIG. 4 flowchart, the program proceeds to S18 in which a duty the duty factor of the PWM control) is outputted. Specifically, the duty factor of the PWM control is controlled to feedback-control current supply so that the detected supply current value of current to the linear solenoid valve 62*d*1 converges to the desired control current value (current supply command value) calculated from the desired clamping pressure value.

As stated above, the embodiment is configured to have an apparatus and method for controlling an automatic transmission (CVT 10) that changes speed of an output of a prime mover (engine 12) mounted on a vehicle (1) and transmits the output to a driven wheel (WL, WR), having an electromagnetic control valve (62*d*; more exactly, linear solenoid valve 62*d*1) that is installed in a hydraulic pressure supply device (62) of the automatic transmission and is operated upon receipt of current from a power source (battery 12*a*) to control hydraulic pressure supply to the automatic transmission, and a current supply controller (desired clamping pressure value calculating block 90*a*1, desired control current value calculating/current supply controlling block 90*a*4, S10 to S12) that is composed of a microcomputer (90*a*) installed on an electronic circuit board (92) and is adapted to calculate a current supply command value (desired control current value) of the current supplied to the electromagnetic control valve based on a hydraulic pressure supply control value (desired clamping pressure value) of the automatic transmission which is calculated based on an operating condition of the vehicle and control current supply from the power source to the electromagnetic control valve based on the calculated current supply command value, comprising: a load detector (other device load condition detecting block 90*a*2) adapted to detect load of an electric device (injector 66, stepper motor 64*a*) that shares ground set on the electronic circuit board with the electromagnetic control valve, wherein the current supply controller calculates the current supply command value based on the hydraulic pressure supply control value and the detected load (S14 to S18).

With this, since the electromagnetic control valve 62*d* that is operated upon receipt of current from the power source (battery) 12*a* installed in the vehicle so as to control hydraulic pressure supply to the automatic transmission (CVT) 10 shares the ground PG set on the board 92 with the other electric device(s), the structure can be made simple.

Further, it is configured to detect the load of the electric device(s) that shares the ground PG with the electromagnetic control valve 62*d* and determine the current supply command value of current to the electromagnetic control valve 62*d* based on the hydraulic pressure supply control value of the CVT (automatic transmission) 10 that is determined based on the detected load and vehicle's running condition. With this, even when a resistance component that exists between the ground PG set on the board 92 and the earth connected to, for instance, the cylinder block 12*c* of the engine 12 adversely affects the detection of current supplied to the electromagnetic control valve 62*d*, it becomes possible to make it less affected.

To be more specific, when the supply current value of current to the electromagnetic control valve 62*d* is detected and current supply to the electromagnetic control valve 62*d* is feedback-controlled so that the detected supply current value converges to the calculated current supply command value, if the load of the electric device(s) varies greatly, it deteriorates voltage fluctuation, i.e., voltage drop of the ground PG, whereby the detection accuracy of current supplied to the electromagnetic control valve 62*d* degrades. To deal with it, it is necessary to take measure, for example, to set control pressure of the CVT 10 to be safer (higher) than desired pressure. However, since it is configured as described above, a countermeasure like setting the control pressure to be safer than the desired pressure is no longer necessary. That is, it becomes possible to make the detection of current supplied to the electromagnetic control valve 62*d* be less affected when the resistance component that exists between the ground PG and earth adversely affects.

In the apparatus and method, the current supply controller includes a current detector (current detecting block 90*a*3) adapted to detect a supply current value to the electromagnetic control valve based on voltage across a current detecting resistor (90*c* 1) interposed at a current supply path (90*b*2) connected to the electromagnetic control valve, and feedback-controls the current supply to the electromagnetic control valve through PWM (i.e., by controlling the duty factor of the PWM control) such that the detected supply current value converges to the calculated current supply command value.

With this, also when current supply is feedback-controlled by controlling the duty factor of the PWM control so that the supply current value converges to the current supply command value, it becomes possible to make the detection of current supplied to the electromagnetic control valve 62*d* be less affected when the resistance component that exists between the ground PG and earth adversely affects, In the apparatus and method, the automatic transmission includes a continuously variable transmission (CVT 10) having a power transmission element (belt 30) installed between an input shaft (14) connected to the prime mover and an output shaft (16) connected to the driven wheel, and the electromagnetic control valve (i.e., linear solenoid valve 62*d*1) is adapted to control pulley clamping pressure applied to both lateral sides of the power transmission element through the hydraulic pressure supply.

With this, it becomes possible to make the detection of current supplied to the electromagnetic control valve 62*d* be less affected when the resistance component that exists between the ground PG and earth adversely affects. In addition, slip of the power transmission element of the CVT 10 can be avoided by increasing the clamping pressure through the valve 62*d*, thereby reliably protecting the power transmission element, while friction can be mitigated by decreasing the clamping pressure, thereby improving power transmission efficiency. Furthermore, the fuel efficiency of the engine 12, which is the prime mover, can be improved.

In the apparatus and method, the current supply controller corrects the hydraulic pressure supply control value based on the detected load and increases a correction amount used to correct the hydraulic pressure supply control value as the detected load becomes larger (S14). With this, in addition to the above effects, slip of the power transmission element (belt 30) of the CVT 10 can be avoided more reliably and the power transmission element can be protected well accordingly.

In the apparatus and method, the load detector detects the load of the electric device by detecting current supplied to the electric device (S14 to S18). With this, in addition to the above effects, it becomes possible to accurately detect the load.

In the apparatus and method, the prime mover includes an engine (12). With this, in addition to the above effects, the fuel efficiency can be improved.

In the apparatus and method, the electric device includes one of an injector (66) and a stepper motor (64*a*) of a DBW mechanism (64), more specifically. includes the both. With this, in addition to the above effects, even when the injector 66 or stepper motor 64*a* shares the ground with the electromagnetic control valve 62*d*, it becomes possible to make the detection of current supplied to the electromagnetic control valve 62*d* be less affected by the resistance component too much.

It should be noted that, in the foregoing, although the "current supply command value (desired control current value) of current to the electromagnetic control valve" is calculated based on the value obtained by correcting with the detected load the hydraulic pressure supply control value (desired clamping pressure value) that is calculated based on the operating condition of the vehicle, it may be calculated by temporarily determining the current supply command value based on the hydraulic pressure supply control value and correcting it with the detected load.

It should also be noted that, although the injector 66 and the stepper motor 64*a* of the DBW mechanism 64 are exemplified as the electric devices, it could instead be a heater of a sensor, a valve operating mechanism, an electric motor of an EGR mechanism, or the like. In other words, any electric device applies as long as it can share the ground PG.

It should also be noted that, although the engine 12 is exemplified as the prime mover, it may be only an electric motor or hybrid combining the engine and the motor.

It should further be noted that the power transmission element of the CVT 10 can be a chain instead of the belt 30. Also, the configuration of the CVT 10 is not limited to the illustrated one. For example, the starting clutch 52 can be removed.

Japanese Patent Application No. 2011-175414 filed on Aug. 10, 2011 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an automatic transmission that changes speed of an output of a prime mover mounted on a vehicle and transmits the output to a driven wheel, having an electromagnetic control valve that is installed in a hydraulic pressure supply device of the automatic transmission and is operated upon receipt of current from a power source to control hydraulic pressure supply to the automatic transmission, and a current supply controller that is composed of a microcomputer installed on an electronic circuit board and is configured to calculate a current supply command value of the current supplied to the electromagnetic control valve based on a hydraulic pressure supply control value of the automatic transmission which is calculated based on an operating condition of the vehicle and control current supply from the power source to the electromagnetic control valve based on the calculated current supply command value, comprising:

a load detector configured to detect load of an electric device that shares ground set on the electronic circuit hoard with the electromagnetic control valve, wherein the current supply controller calculates the current supply command value based on the hydraulic pressure supply control value and the detected load.

2. The apparatus according to claim 1, wherein the current supply controller includes a current detector configured to detect a supply current value to the electromagnetic control valve based on voltage across a current detecting resistor interposed at a current supply path connected to the electromagnetic control valve, and feedback-controls the current supply to the electromagnetic control valve through PWM such that the detected supply current value converges to the calculated current supply command value.

3. The apparatus according to claim 1, wherein the automatic transmission includes a continuously variable transmission having a power transmission element installed between an input shaft connected to the prime mover and an output shaft connected to the driven wheel, and the electromagnetic control valve is configured to control pulley clamping pressure applied to both lateral sides of the power transmission element through the hydraulic pressure supply.

4. The apparatus according to claim 1, wherein the current supply controller corrects the hydraulic pressure supply control value based on the detected load and increases a correction amount used to correct the hydraulic pressure supply control value as the detected load becomes larger.

5. The apparatus according to claim I, wherein the load detector detects the load of the electric device by detecting current supplied to the electric device.

6. The apparatus according to claim 1, wherein the prime mover includes an engine.

7. The apparatus according to claim 1, wherein the electric device includes one of an injector and a stepper motor of a DBW mechanism.

8. A method for controlling an automatic transmission that changes speed of an output of a prime mover mounted on a vehicle and. transmits the output to a driven wheel, having an electromagnetic control valve that is installed in a hydraulic pressure supply device of the automatic transmission and is operated upon receipt of current from a power source to control hydraulic pressure supply to the automatic transmission, and a current supply controller that is composed of a microcomputer installed on an electronic circuit board and is configured to calculate a current supply command value of the current supplied to the electromagnetic control valve based on a hydraulic pressure supply control value of the automatic transmission which is calculated based on an operating condition of the vehicle and control current supply from the power source to the electromagnetic control valve based on the calculated current supply command value, comprising the steps of:

detecting load of an electric device that shares ground set on the electronic circuit board with the electromagnetic control valve; and operating the current supply controller to calculate the current supply command value based on the hydraulic pressure supply control value and the detected load.

9. The method according to claim 8, wherein the current supply controller includes a step of detecting a supply current value to the electromagnetic control valve based on voltage across a current detecting resistor interposed at a current supply path connected to the electromagnetic control valve, and feedback-controls the current supply to the electromagnetic control valve through PWM such that the detected supply current value converges to the calculated current supply command value.

10. The method according to claim 8, wherein the automatic transmission includes a continuously variable transmission having a power transmission element installed between an input shaft connected to the prime mover and an output shaft connected to the driven wheel, and the electromagnetic control valve is configured to control pulley clamping pressure applied to both lateral sides of the power transmission clement through the hydraulic pressure supply.

11. The method according to claim 8, wherein the current supply controller corrects the hydraulic pressure supply control value based on the detected load and increases a correction amount used to correct the hydraulic pressure supply control value as the detected, load becomes larger.

12. The method according to claim 8, wherein the step of detecting detects the load of the electric device by detecting current supplied to the electric device.

13. The method according to claim 8, wherein the prime mover includes an engine.

14. The method according to claim 8, wherein the electric device includes one of an iniector and a stepper motor of a DBW mechanism.

* * * * *